United States Patent [19]

Heymès et al.

[11] 3,990,876
[45] Nov. 9, 1976

[54] MANUFACTURE OF PLASTICS SHEETS
[75] Inventors: Pierre Rene Heymès, Paris, France;
 Rudolf Pelzer, Herzogenrath, Germany
[73] Assignee: Saint-Gobain Industries, Neuilly-sur-Seine, France
[22] Filed: Jan. 15, 1975
[21] Appl. No.: 541,099

[52] U.S. Cl. .................................. 65/23; 65/24; 65/60 B; 65/91; 65/99 A; 156/246; 264/212; 264/216; 427/154
[51] Int. Cl.² .................................. C03C 23/00
[58] Field of Search ............... 65/60, 99 A, 23, 24, 65/60 B, 91, 30 R, 26; 264/174, 212, 216, 178 R; 156/246; 427/154, 165

[56] References Cited
UNITED STATES PATENTS

| | | | |
|---|---|---|---|
| 1,039,829 | 10/1912 | Sievert | 65/23 |
| 1,532,782 | 4/1925 | Sheppord et al. | 156/246 X |
| 2,225,729 | 12/1940 | White | 427/154 |
| 2,445,572 | 7/1948 | Gerould et al. | 65/60 B |
| 2,824,411 | 2/1958 | Goodwillie et al. | 65/60 B |
| 3,243,275 | 3/1966 | Brown | 264/178 F |
| 3,256,124 | 6/1966 | Peyches | 4/174 |
| 3,442,748 | 5/1969 | D'Huart | 65/23 |
| 3,549,447 | 12/1970 | Dearing | 427/154 X |
| 3,689,304 | 9/1972 | Bamford | 65/60 B |
| 3,809,594 | 5/1974 | Brown et al. | 264/178 R |
| 3,841,858 | 10/1974 | Alcash et al. | 65/60 B |

*Primary Examiner*—Robert L. Lindsay, Jr.
*Attorney, Agent, or Firm*—Karl W. Flocks

[57] ABSTRACT

An improved method of making films, sheets or plates of a transparent plastics material of high optical quality comprises depositing a solution, molten mass or reaction mixture which yields the solid plastics on drying or hardening on a moving glass ribbon having a smooth upper surface. The ribbon may be made by the float glass process. The plurality of plastics layer may be deposited one on another.

11 Claims, 2 Drawing Figures

MANUFACTURE OF PLASTICS SHEETS

BACKGROUND OF THE INVENTION

This invention relates to a method of making sheets, including thin films and relatively thick plates, of high optical quality of transparent plastics material. The invention also relates to apparatus suitable for carrying out this method.

There have already been obtained films or sheets of plastics material having a high optical quality by a process in which a solution or molten mass of the plastics material reaction mixture which produces the plastics material is fed in the liquid state by a suitable device, for example a linear slot, a brushing device or a flow head, onto heated drums or endless metallic bands having a surface which is optically smooth. The plastics material hardens in situ under the action of the heat and is then separated from the drum or band support in the form of an endless sheet or film.

In this known process it is difficult to avoid the polished metal surface being subject to mechanical deformation. The quality of the optically polished surface may also be affected by constant re-use of the band or drum. Consequently there is a risk that the state of the surface of the sheet of plastics material, which largely determines its optical quality, will deteriorate due to wear of the support according to its extent of previous use.

SUMMARY OF THE INVENTION

It is an object of the invention to provide a process of the type mentioned above in which the risk of alteration of the optical quality of the sheet of plastics material by use or damage of the surface of the support on which the plastics material is delivered is avoided or reduced.

It is another object of the invention to provide such a process using as a support a material having the best flatness and smoothness which is now industrially available at an acceptable price, and in which the effective length of the support may be increased to practically any value without a large increase in cost.

It is yet another object of the invention to provide a facility for manufacturing sheets of plastics material which are wider than currently available metal bands which are suitable for use in coating machines.

Other objects will appear from the description which follows.

According to one aspect of the present invention, there is provided a method of making sheets of transparent plastics material having high optical quality, which comprises depositing a liquid composition capable of solidifying to form a solid plastics sheet on to a smooth surface of a glass ribbon which moves continuously in a horizontal direction and allowing the deposited material to dry or harden to a solid, the liquid composition being applied to the ribbon immediately after preparation of the ribbon surface.

According to another aspect of the invention, there is provided apparatus for making sheets of transparent plastics material having high optical quality, which comprises fabrication means for making a ribbon of glass by the float glass process, means for continuously transporting the glass ribbon in a horizontal direction from the fabrication means, means for cooling the ribbon after the ribbon leaves the fabrication means and a coating head for depositing a liquid composition capable of solidifying to form a solid plastics sheet on the upper surface of the cooled transported ribbon.

The process according to the invention may be carried out in conjunction with an installation producing continuously a ribbon of glass which is ground and polished mechanically. However, the method of the invention may be practised in a particularly advantageous manner by feeding the solution, molten plastics material or liquid reaction mixture on to a ribbon of glass having a smooth surface which is obtained directly by a thermal process. Such processes include the well-known "float glass" process and processes requiring horizontal drawing of the glass, for example the LIBBEY OWENS process. It is particularly advantageous from the economic point of view to feed the solution, molten plastics material or liquid reaction mixture onto the region of such a ribbon of glass which still retains a high temperature after manufacture which may be used to advantage to accelerate the hardening process.

In a preferred embodiment of the invention, the surface of the ribbon of glass is superficially freed from dust or other impurities which may be deposited thereon. For this purpose it is possible for example before feeding of the solution, plastics material or liquid reaction medium onto the ribbon to pass the ribbon through a washing device.

Further it is advantageous to protect from impurities and contamination the section of the apparatus in which formation of the plastics material sheet on the glass ribbon is carried out.

It is possible, using the method of the invention, to deposit a plurality of superposed layers of plastics material, which may have different compositions on the support. The process thus allows fabrication in a simple manner of composite sheets made of different materials. This is particularly easy to carry out using the process according to the invention because for the manufacture of such composite sheets it is generally necessary to use supports which are relatively long and these long supports, as mentioned above, may be obtained without large additional expense from apparatus for manufacture of continuous glass ribbons.

It has already been suggested to prepare sheets, films or bands of plastics material by flow of material in the liquid state onto a liquid bath of high specific gravity and subject the plastics film on the bath to drawing. In this known process the layer of plastics material is however always under tension which fact on the one hand affects the flatness unfavourably and on the other part considerably limits the possibilities for modification of the thickness and the width of the film of plastics material.

Preferred embodiments of the invention will be described with reference to the accompanying drawings.

DESCRIPTION OF PREFERRED EMBODIMENTS

Figure 1:
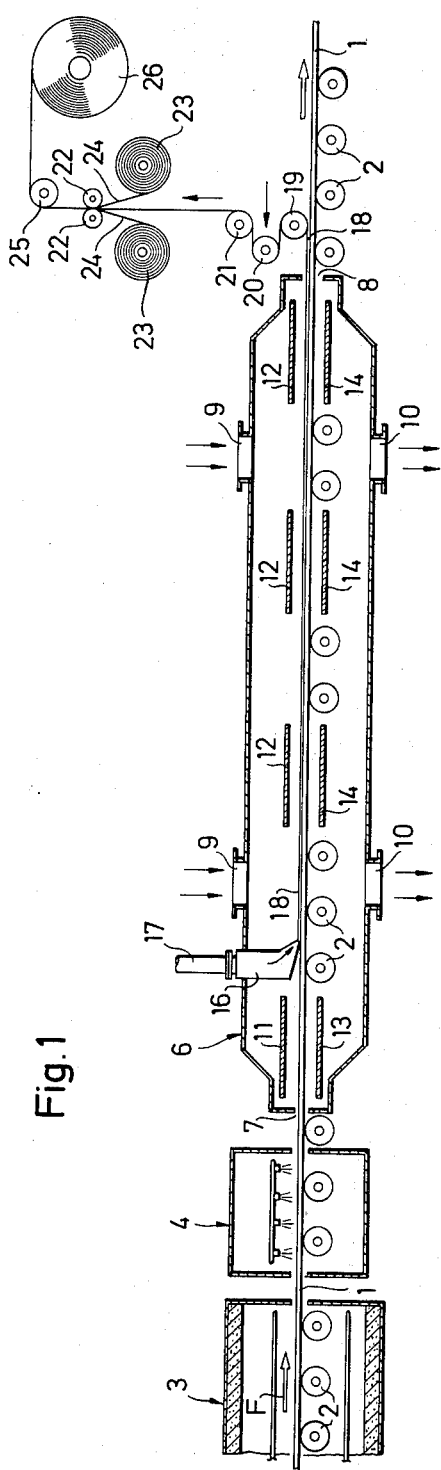
FIG. 1 is a schematic diagram of apparatus according to one embodiment of the invention.

In the apparatus shown in the drawings there is used as a support for the plastics material a ribbon of glass which is continuously manufactured by the float process. The apparatus itself for the manufacture of float glass corresponds to the type which is well known in the art. For this reason this apparatus for preparing float glass is not shown in the drawings. Such apparatus for float glass is described in German Patent Nos. 1,010,247 and 1,471,951.

When the glass ribbon 1 at a temperature of about 600° C is separated from the surface of the bath of molten metal, it is transported on transporter rollers 2 through a cooling unit 3. In this cooling unit 3 or in a cooling zone which follows the glass ribbon is cooled to the desired temperature, which varies according to the characteristics of the plastics material to be applied.

The glass ribbon 1 which moves through the apparatus in the direction of the arrow F passes through a washing device 4 of known type. In this washing device the upper surface of the glass ribbon is freed from any impurities and dust which may be deposited on the glass surface in the manufacturing apparatus for the float glass or in the cooling device.

Immediately after its passage through the washing device 4 the glass ribbon which is still transported by the roller transporters 2, passes through a closed enclosure 6 which surrounds on all sides the glass ribbon and the transporting rollers. In this enclosure there is maintained an atmosphere which is free from dust in the region of flow of the plastics material. The enclosure 6 is provided with an opening 7 for entry of the glass ribbon and an opening 8 for exit of the ribbon coated with plastics material. There is introduced into the enclosure 6, by ducts 9, filtered air which is free from dust whereas evacuation of this air is effected by ducts 10; this air may be heated if required. There is maintained in this enclosure a small excess pressure to prevent exterior air penetrating the enclosure through openings 7 and 8. In the interior of enclosure 6 there is provided above and below the glass ribbon 1 a plurality of devices for electric heating 11, 12, 13, 14. It is possible, owing to the heating devices 11 to 14 to maintain inside the enclosure the desired temperature distribution. For this purpose the heating devices 11, 13, adjacent the entry 7 serve to bring the glass ribbon to the optimum temperature for flow of the liquid plastics composition. The heating devices 12 and 14 have as their function heating of the layer of plastics material to the temperature which is most favourable for drying or hardening in each particular case.

A slot coating head 16 arranged inside the enclosure 6 serves to deliver onto the glass ribbon 1 the plastics composition, which may be a solution, molten plastics mass or a reaction mixture which forms the plastics material in the liquid state. This liquid is fed to the coating head by one or more ducts such as 17. The coating head forms on the glass ribbon a plastics layer 18 which in the space separating the coating head from the exit opening 8 of the enclosure forms itself into a solid or hardened layer so that the sheet thus formed may be detached from the glass ribbon after leaving the enclosure. In order to detach the sheet 18 there is used a roller 19 situated above the glass ribbon. The necessary tension in the sheet is ensured in known manner by the tension roller 20. After changing of direction around roller 21 the sheet 18 is taken by a pair of traction rollers 22 between which it is provided on both sides with a protective sheet 24 fed from rollers 23. The band of plastics material provided with these protective sheets is then passed around roller 25 and finally wound up on spindle 26.

It is evident that instead of very thin sheets which are suitable for winding onto spindles it is also possible to prepare plates of greater thickness which require another process for their detachment from the glass ribbon.

According to the nature of the plastics material for the sheets, films or plates which are thus prepared it may be advisable to deposit on the glass ribbon before feed of a plastics material an agent which assists separation (demoulding agent). For this purpose there may be used for example stearates, silicones, fluorinated hydrocarbons, oils or waxes.

Figure 2:
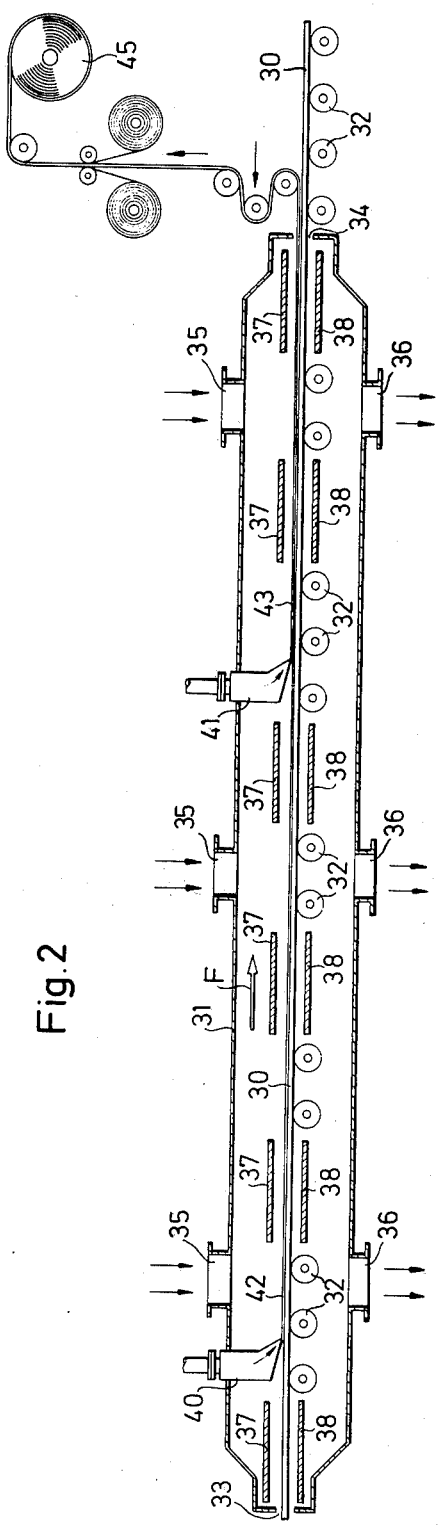
FIG. 2 is a schematic diagram of apparatus according to another embodiment of the invention.

In FIG. 2 there is shown apparatus with which it is possible to manufacture composite plastics sheets formed of two different layers. As has been described in relation to FIG. 1, there is used as a support a glass ribbon 30 fed from a float glass installation which, after having passed over the rollers of a cooling unit, traverses a washing device. Downstream from the washing device (not shown in FIG. 2) the installation comprises an enclosure 31 surrounding the glass ribbon 30 and the transport device formed by rollers 32. The glass ribbon enters the enclosure through the opening 33 and leaves by the opening 34. There is introduced into the enclosure by ducts 35 air which is filtered and dedusted, this air being evacuated by ducts 36. The heating devices 37 arranged above the glass ribbon and the heating devices 38 placed below the latter, serve to establish the optimum temperature conditions for flow of the plastics material and its solidification and/or hardening, for forming the plastics sheet.

The first layer 42 of the composite layer is fed by means of the slot coating head 40 and then solidifies or hardens. The coating head 41 serves for application to the first layer 42 a second layer of another plastics material, in order to obtain a composite sheet 43 formed in two layers. In the path between the head 41 and the outlet 34 of the enclosure the composite sheet is sufficiently solidified under the effect of heating devices 37 and 38 so that after leaving the enclosure 31 it may be detached without damage from the glass ribbon 30 and then rolled up on the spindle 45 in the same manner as has been described in connection with FIG. 1. Instead of two coating heads there may be provided three or more heads in order to obtain sheets composed of three or more layers.

It is possible with a device such as that which has just been described to use any plastics material which up to now has been coated on bands or on drums. The device according to the invention is particularly suitable for manufacture of sheets of plastics material suitable for severe requirements relating to optical quality, particularly flatness and parallelism such as those which are used together with glass sheets for safety windows for vehicles, including windscreens. The manufacture of such windscreens is described for example in German Patent Application Nos. P22.20753.0 and P 22.28299.1. It is believed that the sheets of plastics material prepared according to the process of the present invention exceed in quality for the reasons indicated above sheets of plastics material prepared by other processes.

In many applications, the sheets of plastics material may be provided with superficial coatings of various types having as their purpose provision of one or more additional physical properties, such as low coefficient of friction, resistance to scratches and abrasion, and antireflecting qualities. It is also possible to apply on the ribbons or plastics sheets substances such as colourants, adhesives, agents such as self-sticking substances or anchoring agents facilitating eventual sticking of the sheet to other materials, etc.

Such superficial additional deposits may easily be applied to the ribbons of plastics material produced by the process of the invention. It is sufficient for the purpose to place downstream of the main coating head or heads one or more devices for spraying or coating, applying to the upper surface of the ribbon of plastics material in motion an appropriate substance in the form of a solution, dispersion or aerosol.

We claim:

1. In a method of making self-supporting sheets of transparent plastics material by depositing a liquid composition capable of solidifying to form a solid plastics sheet on to the surface of a moving support and removing the plastics material from the support as a continuous coherent self-supporting sheet, the improvement which comprises providing as the support a continuous glass ribbon having a smooth surface, moving the ribbon continuously in a horizontal direction depositing the liquid composition on the surface immediately after preparation of the smooth surface solidifying the liquid composition while the surface is at an elevated temperature and removing the plastic material as a continuous strip.

2. A method according to claim 1, in which the solid plastics sheet is removed from the glass ribbon and is provided on both its faces with a protective sheet.

3. A method according to claim 1, in which the liquid composition is deposited on the glass ribbon while the glass is at an elevated temperature.

4. A method according to claim 1, in which the ribbon is prepared by the float process.

5. A method according to claim 1, in which the ribbon is prepared by horizontal stretching of the glass at an elevated temperature.

6. A method according to claim 1, in which the smooth surface of the glass ribbon is cleaned before deposition of the liquid composition.

7. A method according to claim 1, in which a separating agent to facilitate separation of the solid plastics sheet from the glass is applied to the smooth surface before deposition of the liquid composition.

8. A method according to claim 1, in which the liquid composition is deposited on the glass and allowed to solidify in an enclosure containing a dust-free atmosphere.

9. A method according to claim 8, in which filtered air is fed to said enclosure.

10. A method according to claim 1, in which the glass ribbon is heated during deposition and solidification of the liquid composition.

11. A method according to claim 1, in which a plurality of layers of liquid composition are deposited on the glass surface.

* * * * *